United States Patent
Tamaki et al.

(10) Patent No.: US 7,123,635 B2
(45) Date of Patent: Oct. 17, 2006

(54) HELIUM-COOLED LASER DEVICE

(75) Inventors: Yusuke Tamaki, Tokyo (JP); Kazuya Takasago, Tokyo (JP); Taisuke Miura, Kanagawa (JP); Hitoshi Sekita, Tokyo (JP)

(73) Assignee: Cyber Laser Inc., Tokyo (JP)

( * ) Notice: Subject to any disclaimer, the term of this patent is extended or adjusted under 35 U.S.C. 154(b) by 357 days.

(21) Appl. No.: 10/619,305

(22) Filed: Jul. 14, 2003

(65) Prior Publication Data
US 2004/0066811 A1 Apr. 8, 2004

(30) Foreign Application Priority Data
Jul. 15, 2002 (JP) ............................ 2002-206316

(51) Int. Cl.
*H01S 3/04* (2006.01)

(52) U.S. Cl. ........................................ 372/34; 372/35
(58) Field of Classification Search ............ 372/34–36
See application file for complete search history.

(56) References Cited

U.S. PATENT DOCUMENTS

| 2,906,101 | A | * | 9/1959 | McMahon et al. | ............... 62/6 |
| 4,563,763 | A | * | 1/1986 | Kuhn | ........................... 372/35 |
| 4,789,988 | A | * | 12/1988 | Trost | ........................... 372/34 |
| 5,034,953 | A | * | 7/1991 | Sekiguchi | ..................... 372/34 |
| 5,682,397 | A | * | 10/1997 | Scheps | ........................ 372/22 |

* cited by examiner

*Primary Examiner*—James Menefee
(74) *Attorney, Agent, or Firm*—Pearne & Gordon LLP

(57) ABSTRACT

The present invention offers a laser oscillator device having sufficient cooling ability to maintain a lasing medium which generates high-density thermal energy at a temperature appropriate for use, while being capable of being made compact. The laser oscillator device comprises an excitation beam source for generating an excitation beam, a laser medium for receiving the excitation beam and performing optical amplification, a laser oscillator device for causing resonance of light emitted by the laser medium for laser oscillation, and a cooling system for cooling said laser medium, wherein the cooling system uses a gas as the heat-carrying medium.

5 Claims, 2 Drawing Sheets

– PRIOR ART –

– PRIOR ART –

HELIUM-COOLED LASER DEVICE

BACKGROUND OF THE INVENTION

The present invention relates to a laser oscillator device, in particular to a laser oscillator device with improved cooling ability and cooling efficiency in the lasing medium.

The basic principle of laser oscillator devices is to illuminate solids such as ruby or gases such as carbon dioxide with an excitation beam to cause a high-energy inversion in their atoms, such that a resonator can be used to amplify the light emitted when their energy states return to their normal level, enabling the light to be extracted in the form of a phase-matched beam of a single color.

FIG. 1 shows the basic idea behind a laser oscillator device. For example, a lasing medium 110 such as ruby receives an excitation beam 120 from a xenon lamp, arc lamp or the like, with light amplification being performed on an optical axis 130 perpendicular to the excitation beam 120. The coherent laser beam 140 amplified and emitted from the lasing medium 110 propagates along the optical axis, is reflected by the mirror 150 on the right side of the drawing, passes in the opposite direction through the lasing medium 110 where it is further amplified, then reaches the mirror 155 on the left side of the drawing where it is reflected back toward the lasing medium 110. The laser beam 140 which is amplified by repeated reflections through the lasing medium 110 in this way can be directed outside the resonator by a combination of a polarized beam splitter 170 and a Pockels cell 160 for selectively rotating the polarization of the laser beam according to a control voltage, or a simple output coupling mirror.

In the drawings, the reference number 180 indicates a cooling device. Since the lasing medium 110 receives an excitation beam 120 and emits a laser beam 140, it can also generate intense heat during operation, so that in order to maintain the temperature of the lasing medium 11 to within an operable temperature, the heat usually must be removed by a cooling device.

While the directions of the excitation beam and the laser beam are perpendicular in the drawing, they may alternatively be provided on the same axis. Many different types of lasing media are known, including ruby, titanium sapphire, alexandrite, Nd-YAG, Er-YAG, dyes, diodes and carbon dioxide, these being potentially in solid, liquid or gaseous form.

The laser beam which is extracted on the above-described principles is highly monotone, coherent, highly directional, and high in energy density, so that it can be used in a very broad range of fields by taking advantage of the various properties. The anticipated types of application can be largely separated into four fields. The first field is microprocessing of optical communication parts. The second field is boring of holes into steel such as in the microinjectors of automobile engines or the like. The third field is medicine, such as treatment of portions where nerves or brain cells are concentrated around the illuminated areas such as in the brain or spine. The fourth field is new semiconductor devices, where they can be used to form fine periodic structures on silicon.

In particular, in most of the above fields, it would be desirable for the output of laser devices to become higher in the future from a variety of practical standpoints. This is because higher power would greatly improve the processing speed.

When performing laser oscillation, the laser oscillator device, including the lasing medium, must naturally be maintained within a predetermined operational temperature range, but if the output power of the laser device is made higher, particularly if the power density of the lasing medium is made higher, the lasing medium can become an extremely strong heat source, thus requiring a method and device capable of adequately and efficiently removing heat generated from the lasing media.

Furthermore, as the output power of the laser device becomes greater, the increase in temperature of the lasing medium is accompanied by a reduction in the thermal conductivity, thus reducing the cooling effect. Consequently, the temperature gradient in the lasing medium becomes very pronounced, generating high-temperature areas, and this effect is one of the factors restricting the power of the laser. There are two reasons for this. First, thermal lensing occurs. Thermal lensing refers to the effect wherein heat which is absorbed by the lasing medium and not eliminated heats up the laser crystal, resulting in a temperature distribution that gives rise to a corresponding refractive index distribution, causing the lasing medium to act as a lens. While thermal lensing due to an excitation laser of up to about 20 W can be handled by modifying the laser resonator, if the power is greater than this, the focal distance of the thermal lens becomes shorter than the laser crystal, thus making such measures useless. The second reason is the occurrence of birefringence due to thermal expansion. For example, birefringence will occur in a crystal which is not naturally birefringent such as a YAG base, given enough heat. This causes the polarization of the beam to be greatly disturbed on each pass through the crystal, resulting in a considerable loss at the polarizers in the resonator.

FIG. 2 is a drawing schematically illustrating a conventional device used for cooling a lasing medium. The lasing medium 210 is housed in a jacket 220 of copper or the like which functions as a heat sink, and one of the outer surfaces 230 of the jacket 220 is cooled by supplying with liquid nitrogen 250 that is stored in a tank 240. If the thermal density of the laser medium is less than or equal to a certain level, then even cooling devices as shown in FIG. 2 based on the conventional art will be able to perform cooling without any functional obstacles, apart from the fact that the equipment becomes quite bulky. However, if the power becomes greater, the following problem can occur.

That is, when the jacket is cooled by contact with liquid nitrogen, the liquid nitrogen will vaporize and form bubbles if the thermal density becomes very large, but the bubbles will reduce the area of effective contact with the liquid nitrogen and consequently result in reduced cooling ability. More specifically, as long as the heat-carrying medium is liquid, the cooling efficiency will be high because the heat capacity per unit volume is higher than that of a gas, but if the heat-carrying medium is vaporized by the heat from the lasing medium, a flow consisting of a liquid and a gaseous phase will be generated. This results in non-linearities between the heat capacity and amount of heat removed, as well as making it difficult to control the temperature of the lasing medium due to a drop in the cooling ability as described above.

Furthermore, the increased heat capacity from the laser medium will require the liquid nitrogen tank to be made larger, and when considering the need to provide liquid nitrogen replenishing equipment and equipment to vent off the vaporized nitrogen, the equipment will need to be made even larger.

Although it is effective to cool the laser medium to a lower temperature than is conventional in order to reduce the temperature gradient occurring in the laser medium to raise the output power, the liquid nitrogen that is conventionally used has an evaporation temperature of about 77.3 K at 1 atmosphere, so that it is theoretically impossible to cool it to a temperature lower than this. While lower temperatures can be achieved by using liquid helium which has an evaporation temperature of 4.2 K as the medium, the problem of the reduced cooling ability due to vaporization of the liquid nitrogen at the thermal exchange interface is still not resolved as in the case where liquid nitrogen is used. Furthermore, the equipment required for insulated containers and the like must be made even larger than in the case of liquid nitrogen when using helium which has a lower evaporation temperature.

BRIEF SUMMARY OF THE INVENTION

The present invention is offered in order to overcome the above-described problems of the conventional art, and proposes a laser oscillator device as described below in order to overcome the problems. Additionally, in addition to solving the problems described above, the present invention has many technical characteristics as described below.

A first embodiment of the present invention proposes a laser oscillator device comprising an excitation beam source for generating an excitation beam; a lasing medium receiving said excitation beam for amplifying light; a laser oscillator for inducing resonance of light emitted from said lasing medium to perform laser oscillation; and a cooling system for cooling the lasing medium; the cooling system using a gas as a heat-carrying medium.

With this laser oscillator device, a medium which is always in gaseous form in the vicinity of the temperatures of use is used as the heat-carrying medium or heat-exchange medium, thus preventing heat from the lasing medium causing a two-phase flow, and offering stable heat exchange ability.

According to the present invention, the cooling system may cool the lasing medium to a temperature lower than the evaporation temperature of liquid nitrogen.

Many of the materials used in laser media or related structures have their maximum thermal conductivity at temperatures of 70 K or less. For example, the temperatures at which the thermal conductivity are maximum are about 40 K for sapphire, about 10 K for gold, about 15 K for copper, about 50 K for indium and about 10 K for quartz. Therefore, a maximum thermal conductivity can be obtained by cooling these media or structural materials to less than 77.3 K which is the evaporation temperature of liquid nitrogen, preferably to a temperature around which the thermal conductivity is maximized, as a result of which the cooling efficiency is increased, and as a result, the output of the laser device can be increased.

Additionally, according to the present invention, the cooling system may use a Gifford-McMahon (GM) type refrigerator.

While the required cooling ability can be obtained by GM refrigerators, pulse tube refrigerators, Stirling type refrigerators and the like, the use of GM refrigerators, which make use of adiabatic expansion of gases to cool to extremely low temperatures of a few K, is preferable for enabling stable cooling to be obtained. While such refrigerators are generally able to cool to temperatures of less than the evaporation temperature of liquid nitrogen, there is no absolute need to cool to below the evaporation temperature of liquid nitrogen, and if the laser power is small, there would be no obstacle to obtaining the necessary output power even above that temperature.

Furthermore, according to the present invention, the heat-carrying medium may be helium gas. Helium gas is a gas at 4.2 K and above, and maintains a gaseous state even over an extremely broad temperature range. It is therefore favorable for use in the cooling device of the present invention.

According to the present invention, the cooling system may comprise a cooling holder for holding and cooling the lasing medium; such that the cooling holder and lasing medium contact each other at only a single surface.

According to the conventional art, a cooling holder is in the form of a tube having, for example, a rectangular cross section, housing therein a laser medium having a similar rectangular cross section, and has the function of removing heat from the periphery of the lasing medium. However, while the cooling function of a cooling holder functions efficiently only when the thermal conductivity of the cooling holder is higher than that of the lasing medium, if the thermal conductivity of the cooling holder is lower than that of the lasing medium, the lasing medium can actually be more effectively cooled when only one surface contacts the cooling holder. This is based on the finding that, for example, although the thermal conductivity of titanium sapphire crystal is lower than the thermal conductivity of copper, it increases with a drop in the temperature, and exceeds the thermal conductivity of copper at less than a certain temperature.

According to one embodiment of the present invention, the cooling holder is planar, and supports the lasing medium on a top surface. Since a lasing medium and cooling holder can be effectively cooled if they contact each other at just a single surface, the structure can be simplified by making the cooling holder planar. Furthermore, in the case of this structure, it is easy to apply adequate pressure when bringing the lasing medium and cooling holder into contact.

According to another embodiment of the present invention, the cooling holder is in the form of a tube having openings on both ends and housing the lasing medium. When used in a temperature range where the thermal conductivity of the lasing medium is greater than the thermal conductivity of the cooling holder, even when the two are in contact at only a single surface, the tubular form of the cooling holder enables radiation from the periphery of the lasing medium to be shielded, as a result of which the cooling efficiency can be improved.

According to another embodiment of the present invention, the cooling holder is mainly composed of copper. The material of the cooling holder must have excellent thermal conductivity, and metals and composite materials such as ceramics, PGS graphite sheets and the like may be used, among which copper is a typical example.

According to an embodiment of the present invention, the lasing medium is a titanium sapphire crystal. Lasers using titanium sapphire crystals have an extremely wide range of possible applications as variable wavelength lasers.

According to the present invention, the lasing medium and cooling holder may be attached by means of materials selected from among indium, silver paste, epoxy and varnish. While the adhesive for the lasing medium and cooling holder must have a high thermal conductivity as well as high adhesive strength over an extremely broad range of temperatures including extremely low temperatures, the above adhesives are considered to be materials that are capable of satisfying these conditions at least to some extent. However, the adhesive may be of something other than indium, silver paste, epoxy or varnish, as long as it has good thermal conductivity and has sufficient adhesive strength.

Due to the above-described structure, the present invention offers a laser oscillator device having a cooling ability capable of handling even laser media with large heat capacities. Furthermore, the laser oscillator device of the present invention is compact and has an exceptional cooling efficiency.

DETAILED DESCRIPTION OF THE INVENTION

Figure 1:
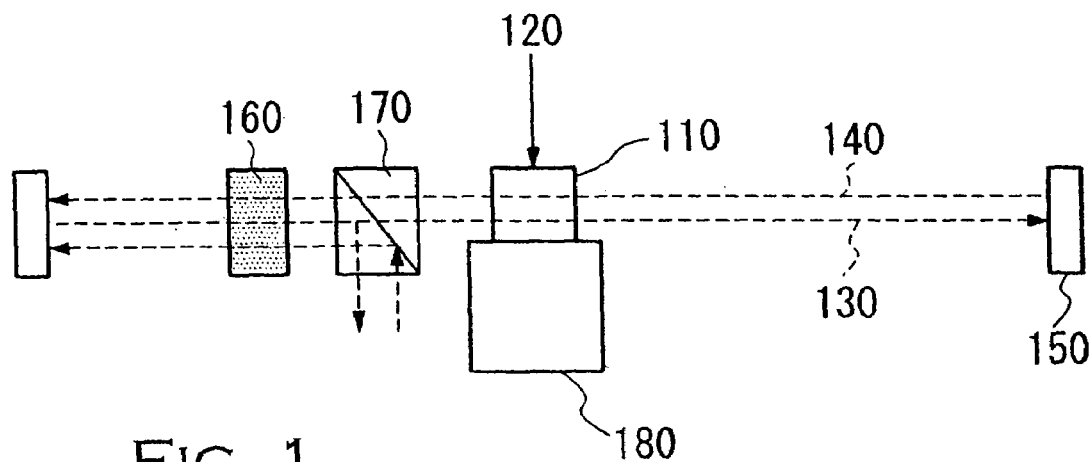
FIG. 1 is a schematic diagram illustrating the basic concepts behind a laser oscillator device.
Figure 2:
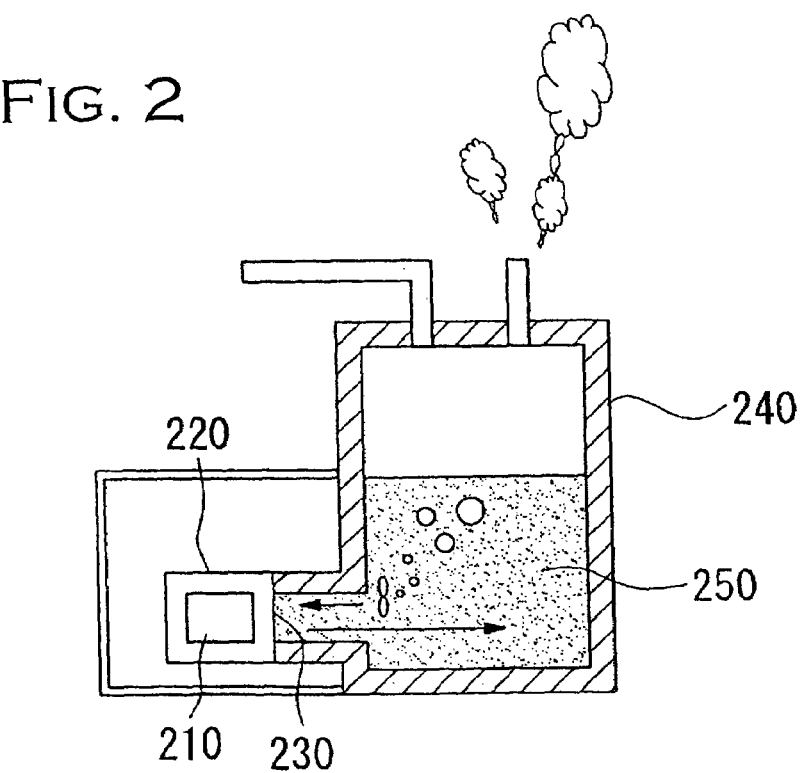
FIG. 2 is a schematic diagram illustrating a liquid nitrogen cooling device as is used to cool the lasing medium according to the conventional art.
Figure 3:
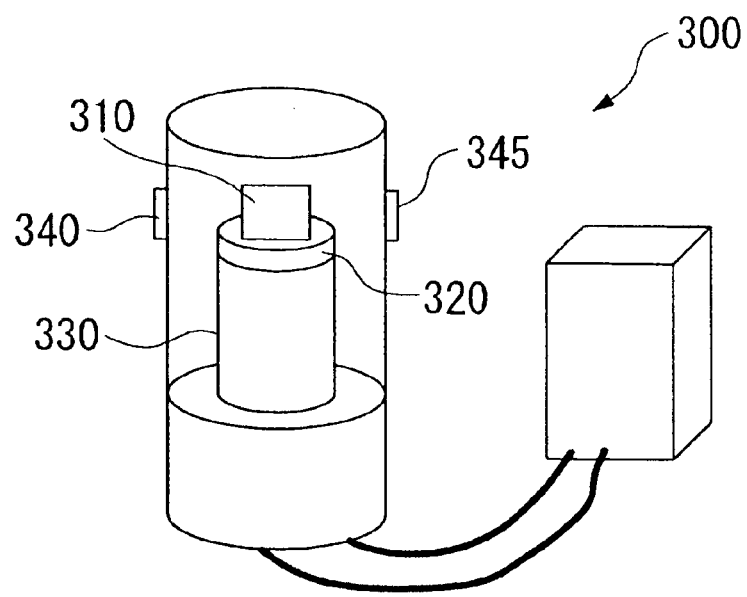
FIG. 3 is a schematic diagram illustrating a laser oscillator device based on the present invention.

FIG. 3 shows an embodiment of the present invention. The laser oscillator device 300 comprises a laser crystal 310 and a cooling holder 320 on which the laser crystal 310 is mounted, housed in a cylindrical vacuum tank 330 the inside of which is held vacuum. A pair of windows 340, 345 are provided at opposing positions of the vacuum tank 330 along the optical axis of the laser oscillator device, such that a laser beam is repeatedly amplified by the laser crystal 310 while being reflected by a pair of mirrors (not shown) provided outside these windows 340, 345. While the laser oscillator device 300 also is to be understood to have an excitation beam source for supplying an excitation beam, and optical elements such as a Pockels cell and beam splitter for injecting and extracting the laser beam, such conventional components were described in FIG. 1 and shall be omitted here.

The base portion of the vacuum tank 330 is provided with a cooling portion such as a Gifford-McMahon type (GM) refrigerator which cools gases by adiabatic expansion in order to achieve extremely low temperatures of as low as 5 K as needed. Gases such as helium which are cooled in the cooling portion by repeated adiabatic expansion are made to circulate through the bottom portion of a cooling holder 320 mounted on the laser crystal 310 inside the vacuum tank 330, thereby to perform heat exchange and cool the cooling holder. The gas pipes (not shown) of the GM refrigerator are connected to a gas compressor provided outside the vacuum tank 330, to supply driving force for circulation of the helium gas.

Taking helium gas as an example of a heat-carrying medium, since helium is gaseous at temperatures of 4.2 K and above, it will not change from a liquid state to a gaseous state even if the temperature rises due to heat exchange with the laser crystal 310 in the cooling holder 320, as is the case with the liquid nitrogen used to cool laser crystals conventionally. Accordingly, the cooling ability of the refrigerator is always determined by the heat capacity of the laser crystal 310, temperature of the helium gas and the flow rate of the helium gas, thus enabling a desired cooling ability to be obtained.

Additionally, there is no need to provide a tank for storing liquid and equipment for venting gases as in conventional cooling device using liquid nitrogen, so that the device overall can be made considerably more compact.

While a GM refrigerator was given as an example of a refrigerator used in the above embodiment, other forms other than GM refrigerators are possible as long as they use gases as the heat-carrying media. For example, pulse tube refrigerators or Stirling refrigerators may also be used. Additionally, since helium gas retains a gaseous state to extremely low temperatures as described above, it is a heat-carrying medium that is extremely suitable for use when requiring cooling to extremely low temperatures, but under conditions requiring cooling to between 4–5 K, it is also possible to use gases other than helium, such as hydrogen gas.

Figure 4:
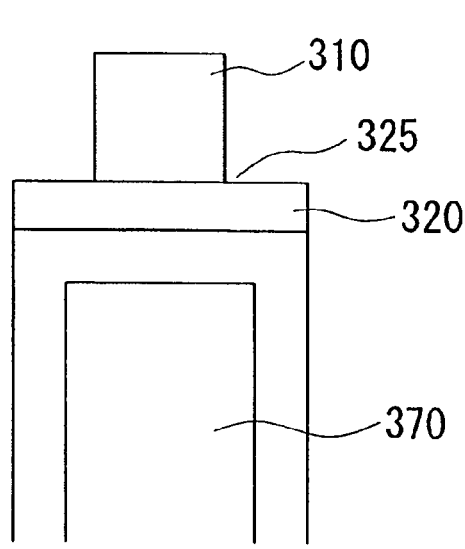
FIG. 4 is a section view of a first embodiment of a cooling holder.

FIG. 4 is a section view of a laser crystal 310 and a cooling holder 320 cut along a plane normal to the optical axis. The laser crystal 310, composed of titanium sapphire, is attached to the copper cooling holder 320 by indium 325. The top surface of the cooling holder 320 contacts and exchanges heat with the laser crystal 310 through the medium of the indium layer 325. The bottom surface of the cooling holder 320 exchanges heat with helium gas 370 of an extremely low temperature supplied from the GM refrigerator. As a result, the laser crystal 310 is cooled to a predetermined operative temperature and the temperature is maintained.

While the thermal conductivity of the titanium sapphire crystal is 0.3 W/cm·K at room temperature, it rises to 6 W/cm·K at 80 K which is roughly the evaporation temperature of liquid nitrogen, and at 40 K, suddenly rises even further to 80 W/cm·K. Therefore, there are considerable benefits in terms of cooling efficiency and increased output to cooling the temperature of the titanium sapphire crystal to about 40 K where the thermal conductivity of the crystal is maximum. As one example, cooling the titanium sapphire crystal to 40 K enabled the laser power to be raised to 1.5 to 2 times that of room temperature.

The adhesive used to attach the laser crystal 310 and the cooling holder 320 may be of a type other than indium, such as silver paste, epoxy or varnish as long as it has good thermal conductivity and has sufficient adhesive force even when cooled. Additionally, the cooling holder may be of any material as long as it has good thermal conductivity in the relevant temperature range, of which copper is typical, but it is also possible to use other metals, and composite materials such as ceramics and PGS graphite sheets.

Figure 5:
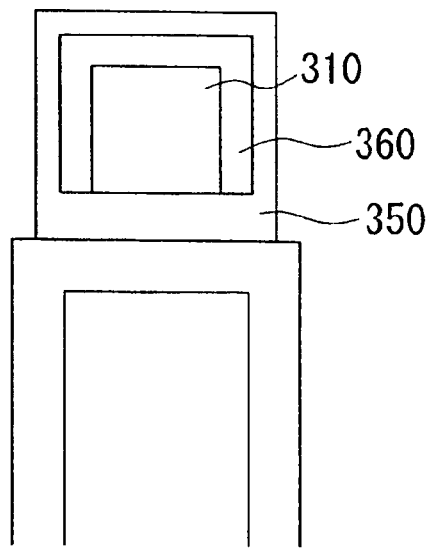
FIG. 5 is a section view of a second embodiment of a cooling holder.

FIG. 5 shows another embodiment using a cooling holder 350 having a hollow rectangular cross section. In the case of this embodiment, the cooling holder 350 surrounds the top, bottom and side surfaces of the laser crystal 310 with the exception of the surfaces in the axial direction. Here, only the bottom surface of the laser crystal 310 is attached to the cooling holder 350, and the side surfaces and top surface are preferably provided with a gap 360. This is due to the fact that when taking the combination of a titanium sapphire crystal and a copper cooling holder as an example, the thermal conductivity of a titanium sapphire crystal is greater than the thermal conductivity of copper at less than 100 K, so that at the side portions and top portions, the titanium sapphire crystal is basically of a lower temperature than the cooling holder. However, although this depends on the conditions of the vacuum tank, the side portions and top portion of a cooling holder generally have the effect of cutting off radiative heat from the vacuum tank. Additionally, there may be cases in which surfaces other than the bottom surface of the laser crystal are made to contact the cooling holder for the purpose of reinforcing the adhesion.

What is claimed is:

1. A laser oscillator device comprising:
an excitation beam source for generating an excitation beam;
a lasing medium receiving said excitation beam for amplifying light;
a laser oscillator for inducing resonance of light emitted from said lasing medium to perform laser oscillation; and
a cooling system comprising a cooling holder for cooling and holding said lasing medium;
said cooling system using a gas as a heat-carrying medium;
said cooling holder being in the shape of a tube having openings on both end and housing a lasing medium; and
said cooling holder and said lasing medium contacting each other at only a single surface.

2. A laser oscillator device in accordance with claim 1, wherein said cooling system cools the lasing medium to a temperature lower than the evaporation temperature of liquid nitrogen.

3. A laser oscillator device in accordance with claim 1, wherein said cooling holder is composed mainly of copper.

4. A laser oscillator device in accordance with claim 1, wherein said lasing medium is a titanium sapphire crystal.

5. A laser oscillator device in accordance with claim 1, wherein said lasing medium and said cooling holder are attached by means of a material selected from among indium, silver paste, epoxy and varnish.

* * * * *